(12) United States Patent
Miyako et al.

(10) Patent No.: US 7,902,514 B2
(45) Date of Patent: Mar. 8, 2011

(54) IMAGE DETECTING DEVICE AND IMAGE CAPTURING SYSTEM

(75) Inventors: Kuniaki Miyako, Minami-ashigara (JP);
Hajime Nakata, Minami-ashigara (JP);
Kazuo Hakamata, Odawara (JP);
Yasunori Ohta, Yokohama (JP)

(73) Assignee: Fujifilm Corporation, Tokyo (JP)

( * ) Notice: Subject to any disclaimer, the term of this patent is extended or adjusted under 35 U.S.C. 154(b) by 251 days.

(21) Appl. No.: 12/343,167

(22) Filed: Dec. 23, 2008

(65) Prior Publication Data

US 2009/0127471 A1 May 21, 2009

Related U.S. Application Data

(63) Continuation-in-part of application No. 12/212,033, filed on Sep. 17, 2008, now abandoned.

(30) Foreign Application Priority Data

Sep. 25, 2007 (JP) ................................. 2007-247205
Sep. 25, 2008 (JP) ................................. 2008-245500

(51) Int. Cl.
*G01T 1/24* (2006.01)
(52) U.S. Cl. ........... 250/370.15; 250/370.08; 250/370.09

(58) Field of Classification Search ............. 250/370.08, 250/370.09, 370.15
See application file for complete search history.

(56) References Cited

U.S. PATENT DOCUMENTS 7,078,703 B2    7/2006    Watanabe

FOREIGN PATENT DOCUMENTS

JP          2003-014860 A          1/2003

*Primary Examiner* — David P Porta
*Assistant Examiner* — Mark R Gaworecki
(74) *Attorney, Agent, or Firm* — Sughrue Mion, PLLC (57) ABSTRACT

An image detecting device (radiation solid-state detecting device) including an image detector (sensor substrate) for recording an image and outputting the recorded image as image information; a temperature regulation control unit for performing a temperature regulation control operation to adjust the image detector to a predetermined temperature; and an image information output detecting unit (timing control signal detector) for detecting the output of the image information from the image detector, and outputting the detected output as an image information output detection signal to the temperature regulation control unit, wherein the temperature regulation control unit halts the temperature regulation control operation on the image detector based on the image information output detection signal that is input thereto.

19 Claims, 9 Drawing Sheets

IMAGE DETECTING DEVICE AND IMAGE CAPTURING SYSTEM

This is a Continuation-In-Part of application Ser. No. 12/212,033 filed Sep. 17, 2008. The entire disclosure of the prior application, application Ser. No. 12/212,033, is hereby incorporated by reference.

BACKGROUND OF THE INVENTION

1. Field of the Invention

The present invention relates to an image detecting device for outputting image information representative of an image recorded in a given recording area, and to an image capturing system which incorporates such an image detecting device therein.

2. Description of the Related Art

In the medical field, there have widely been used image capturing apparatuses, which apply radiation from a radiation source to a subject (a patient) and detect the radiation that has passed through the subject with an image detector to acquire radiation image information of the subject.

Japanese Laid-Open Patent Publication No. 2003-014860 discloses that the temperature of a radiation detector, such as a CCD or the like, is detected by a temperature sensor and controlled to reach a predetermined temperature by way of temperature regulation, for preventing the radiation detector from suffering dew condensation.

When an image detector such as a radiation detector or the like operates to read a detected image, i.e., to output detected image information, if a temperature regulating means such as a cooling fan or the like is energized to regulate the temperature of the image detector, a drive signal that energizes the temperature regulating means may possibly be added to the image information, resulting in a reduction in quality of the read image. Japanese Laid-Open Patent Publication No. 2003-014860 shows nothing concerning the details of temperature regulation upon reading a detected image from the radiation detector.

SUMMARY OF THE INVENTION

It is an object of the present invention to provide an image detecting device and an image capturing system, which are capable of obtaining high-quality images.

An image detecting device according to the present invention comprises an image detector for recording an image and outputting the recorded image as image information, a temperature regulation control unit for performing a temperature regulation control operation to adjust the image detector to a predetermined temperature, and an image information output detecting unit for detecting the output of the image information from the image detector and outputting the detected output as an image information output detection signal to the temperature regulation control unit, wherein the temperature regulation control unit halts or relaxes a temperature regulation control operation on the image detector based on the image information output detection signal that is input thereto.

According to the present invention, when the image is read, i.e., when the image information is output, the temperature regulation control unit halts or relaxes the temperature regulation control operation on the image detector based on the image information output detection signal input thereto. Therefore, noise caused by the temperature regulation control operation is prevented from being added to the radiation image (radiation image information), and hence the produced radiation image is high in quality.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
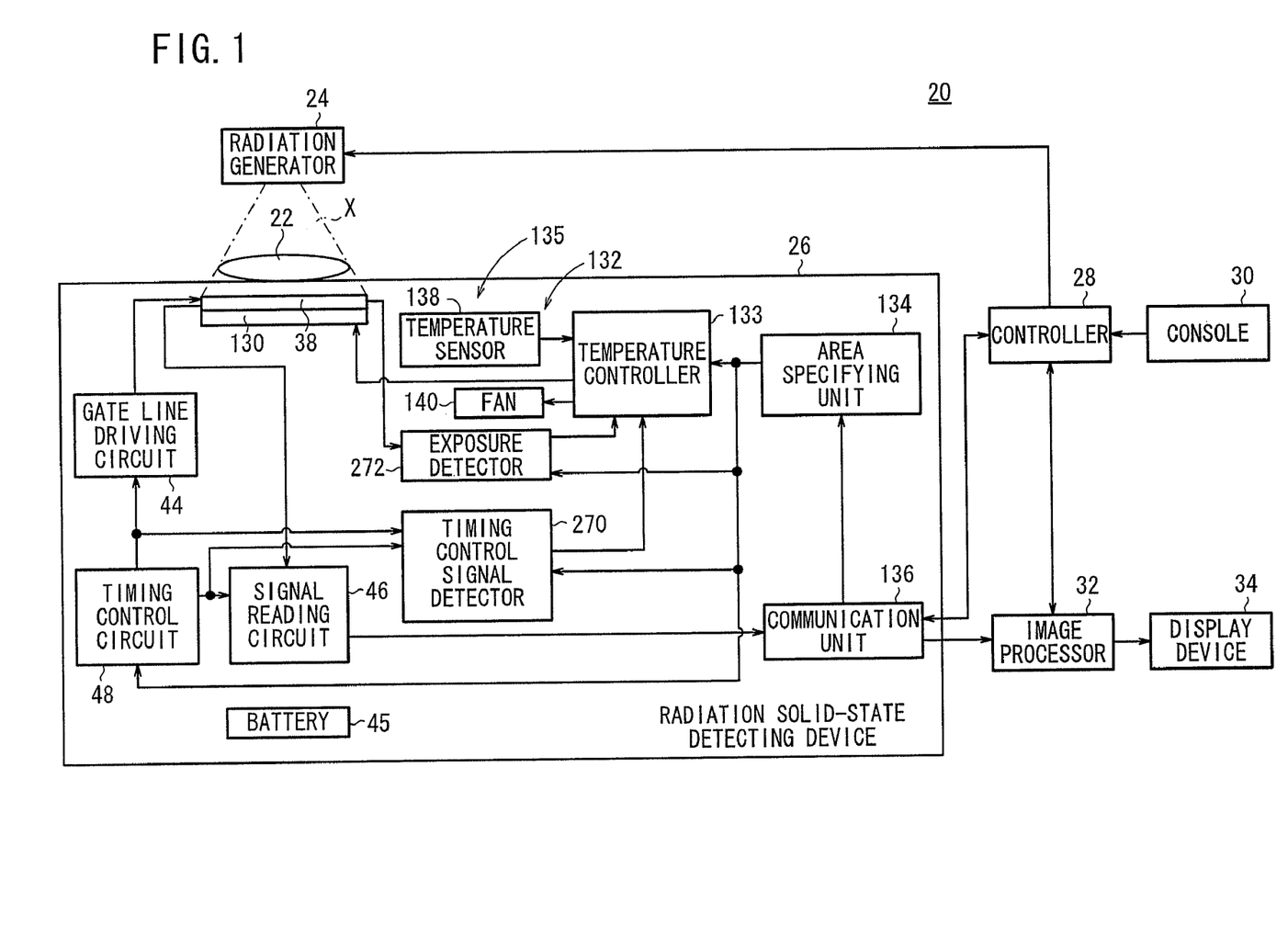
FIG. 1 is a block diagram of an image capturing system according to an embodiment of the present invention.

As shown in FIG. 1, an image capturing system 20 according to an embodiment of the present invention comprises a radiation generator 24 for generating and applying radiation X to a subject 22, typically a patient, a radiation solid-state detecting device (an image detecting device, a radiation image information detecting device) 26 for detecting radiation X that has passed through the subject 22, a controller 28 for controlling the radiation generator 24 and the radiation solid-state detecting device 26, a console 30 for setting in the controller 28 image capturing conditions such as a radiation dose of the radiation X that is applied to the subject 22, an image processor 32 for processing radiation image information of the subject 22, which is read from the radiation solid-state detecting device 26, and a display device 34 for displaying the processed radiation image information.

The radiation solid-state detecting device 26 comprises a sensor substrate (image detector) 38, a gate line driving circuit 44, a battery 45, a signal reading circuit 46, a timing control circuit 48, a temperature regulation control unit 135, an area specifying unit 134, a communication unit 136, a timing control signal detector (image information output detecting unit) 270, and an exposure detector (image recording detecting unit) 272. The temperature regulation control unit 135 comprises a cooling panel 130 and a cooling panel energizing unit 132. The cooling panel energizing unit 132 comprises a temperature controller 133, a temperature sensor 138, and a fan (cooling fan) 140.

Figure 2:
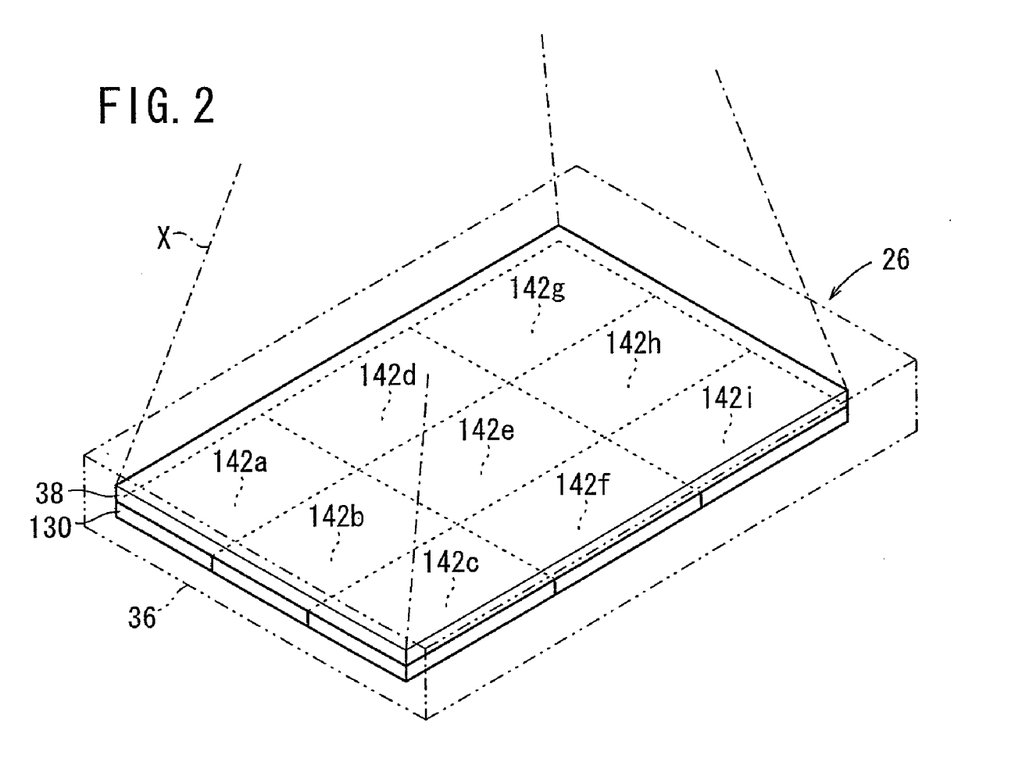
FIG. 2 is a perspective view of a radiation solid-state detecting device shown in FIG. 1, with a cooling panel disposed on a rear surface of a sensor substrate.

FIG. 2 shows the radiation solid-state detecting device 26 in perspective. As shown in FIG. 2, the radiation solid-state detecting device 26 comprises a sensor substrate 38 housed in a protective casing 36 for storing (recording) radiation image information carried by the radiation X that has passed through the subject 22 (see FIG. 1), and a cooling panel 130 held closely against a rear surface of the sensor substrate 38, which lies opposite to a front surface thereof that is irradiated with the radiation X.

The cooling panel 130 is disposed substantially fully over the rear surface of the sensor substrate 38, and comprises nine rectangular cooling units 142a through 142i placed on the rear surface of the sensor substrate 38.

Figure 3:
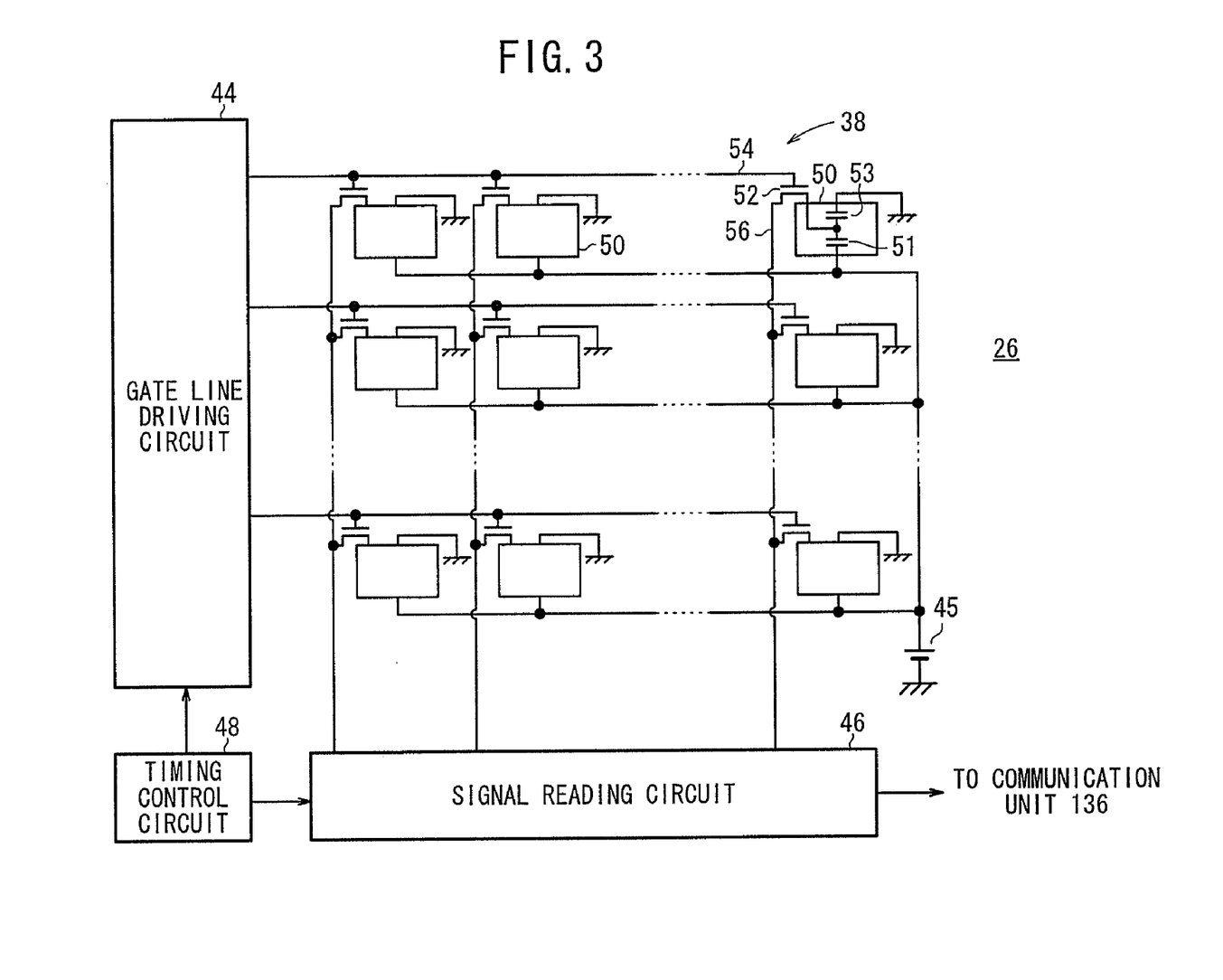
FIG. 3 is a block diagram of the radiation solid-state detecting device shown in FIG. 1.

FIG. 3 shows the radiation solid-state detecting device 26 in block form. As shown in FIG. 3, the radiation solid-state detecting device 26 comprises the sensor substrate 38, a gate line driving circuit 44 having a plurality of driving ICs, not shown, a signal reading circuit 46 having a plurality of reading ICs 42 (see FIG. 4), and a timing control circuit 48 for controlling the gate line driving circuit 44 and the signal reading circuit 46.

The sensor substrate 38 comprises an array of thin-film transistors (TFTs) 52 arranged in rows and columns, a photoelectric conversion layer 51 made of a material such as amorphous selenium (a-Se) for generating electric charges upon detection of the radiation X, wherein the photoelectric conversion layer 51 is disposed on the array of TFTs 52, and an array of storage capacitors 53 connected to the photoelectric conversion layer 51. When radiation X is applied to the sensor substrate 38, the photoelectric conversion layer 51 generates electric charges, and the storage capacitors 53 store the generated electric charges. Then, the TFTs 52 are turned on, one row at a time, to read the electric charges from the storage capacitors 53 as an image signal. In FIG. 3, the photoelectric conversion layer 51 and one of the storage capacitors 53 are shown as representing a pixel 50, wherein the pixel 50 is connected to one of the TFTs 52. Details of the other pixels 50 are omitted from illustration. Since amorphous selenium tends to be changed in structure and lose functions thereof at high temperatures, the amorphous selenium needs to be used within a certain temperature range. Therefore, some means for cooling the sensor substrate 38 should preferably be provided. The TFTs 52, which are connected to respective pixels 50, are connected to respective gate lines 54 extending parallel to the rows, and to respective signal lines 56 extending parallel to the columns. The gate lines 54 are connected to the gate line driving circuit 44, and the signal lines 56 are connected to the signal reading circuit 46.

Figure 4:
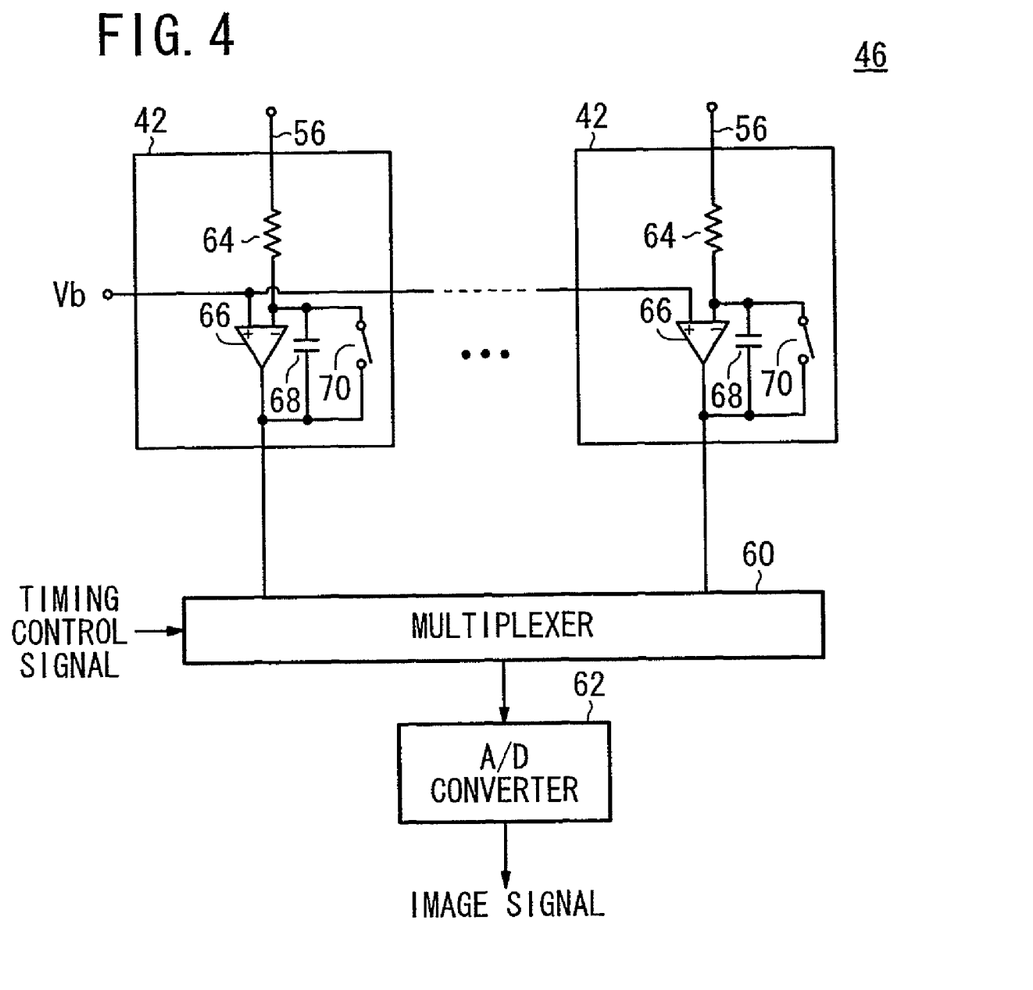
FIG. 4 is a detailed block diagram of a signal reading circuit shown in FIG. 3.

FIG. 4 shows the signal reading circuit 46 in detailed block form. As shown in FIG. 4, the signal reading circuit 46 comprises a plurality of reading ICs 42 connected to respective signal lines 56 of the sensor substrate 38 (see FIGS. 1 through 3), a multiplexer 60 for selecting the pixels 50 that are connected to one of the signal lines 56 based on a timing signal from the timing control circuit 48, and an A/D converter 62 for converting radiation image information read from the selected pixels into a digital image signal, and sending (outputting) the digital image signal to the image processor 32 via the communication unit 136.

Each of the reading ICs 42 comprises an operational amplifier (integrating amplifier) 66 for detecting a current supplied from the signal line 56 through a resistor 64, an integrating capacitor 68, and a switch 70. The operational amplifier 66 has an inverting input terminal connected to the signal line 56 through the resistor 64, and a non-inverting input terminal supplied with a reference voltage Vb.

Figure 5:
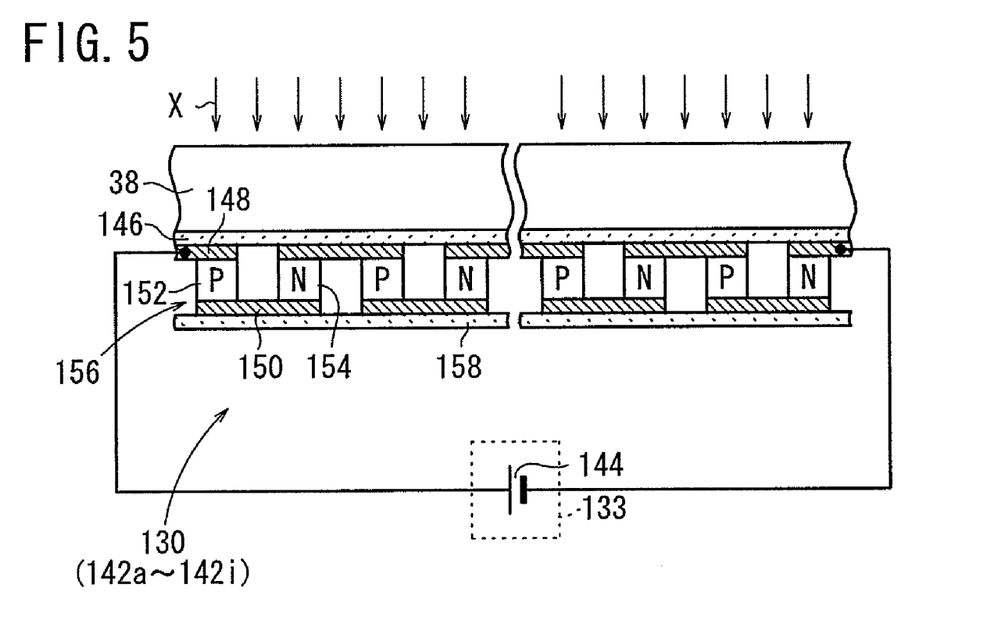
FIG. 5 is a fragmentary cross-sectional view of the sensor substrate and the cooling panel shown in FIG. 2.

FIG. 5 shows in fragmentary cross section the sensor substrate 38 and the cooling panel 130 (see FIGS. 1 and 2).

Each of the cooling units 142a through 142i of the cooling panel 130 comprises a plurality of Peltier devices 156.

Specifically, each of the cooling units 142a through 142i comprises an endothermic substrate 146 held closely against the rear surface of the sensor substrate 38, a plurality of endothermic electrodes 148 disposed at given spaced intervals on the endothermic substrate 146, P-type semiconductor devices 152 and N-type semiconductor devices 154 joined respectively to opposite ends of the endothermic electrodes 148, a plurality of exothermic electrodes 150 each interconnecting a P-type semiconductor device 152 connected to one of the endothermic electrodes 148 and an N-type semiconductor device 154 connected to an adjacent one of the endothermic electrodes 148, and an exothermic substrate 158 held closely against the exothermic electrodes 150.

In FIG. 5, the endothermic substrate 146, the endothermic electrodes 148, the P-type semiconductor devices 152, the N-type semiconductor devices 154, the exothermic electrodes 150, and the exothermic substrate 158 are stacked successively in this order downwardly from the rear surface of the sensor substrate 38, thereby making up each of the cooling units 142a through 142i.

Each of the Peltier devices 156 is made up of two adjacent endothermic electrodes 148, an exothermic electrode 150 extending between the two endothermic electrodes 148, and a P-type semiconductor device 152 and an N-type semiconductor device 154, which are interconnected by the exothermic electrode 150. The temperature controller 133 comprises a DC power supply 144 connected to the endothermic electrode 148 joined to the leftmost P-type semiconductor device 152, as well as to the endothermic electrode 148 joined to the rightmost N-type semiconductor device 154, as shown in FIG. 5.

The endothermic substrate 146 and the exothermic substrate 158 are preferably made of a thermally conductive material, e.g., a ceramic, the thermal conductivity of which is oriented from the sensor substrate 38 toward the cooling units 142a through 142i.

As described above, the photoelectric conversion layer 51 (see FIG. 3) of the sensor substrate 38 is made from amorphous selenium. Since amorphous selenium tends to change in structure and lose functions at high temperatures, the amorphous selenium needs to be used within a given temperature range. The radiation solid-state detecting device 26 includes the temperature regulation control unit 135 (see FIG. 1) for cooling the sensor substrate 38 when the temperature of the photoelectric conversion layer 51 (amorphous selenium) exceeds the temperature range, thereby keeping the temperature of the photoelectric conversion layer 51 within the given temperature range.

The temperature sensor 138 of the temperature regulation control unit 135, which is disposed near the sensor substrate 38, detects the temperature of the sensor substrate 38 depending on the temperature of the amorphous selenium, continuously or at certain time intervals, and outputs the detected temperature of the sensor substrate 38 to the temperature controller 133. The temperature controller 133 determines whether the input temperature of the sensor substrate 38 has exceeded a given upper-limit temperature, depending on the upper-limit value of the temperature range for the photoelectric conversion layer 51 (amorphous selenium). If the temperature controller 133 judges that the temperature of the sensor substrate 38 has exceeded the upper-limit temperature, then the temperature controller 133 supplies direct current from the DC power supply 144 to the Peltier devices 156, and energizes the fan 140. When the Peltier devices 156 are supplied with direct current, they exhibit a phenomenon referred to as the Peltier effect, i.e., the junctions between the endothermic electrodes 148 and the P-type semiconductor devices 152 and the N-type semiconductor devices 154 absorb heat of the amorphous selenium from the sensor substrate 38 through the endothermic substrate 146. Further, the junctions between the P-type semiconductor devices 152 and the N-type semiconductor devices 154 and the exothermic electrodes 150 radiate heat, which has been transferred from the junctions of the endothermic electrodes 148 through the P-type semiconductor devices 152 and the N-type semiconductor devices 154, through the exothermic substrate 158 and out of the cooling panel 130. The fan 140 applies air to the exothermic substrate 158 in order to cool the exothermic substrate 158 and to promote heat radiation therefrom.

The upper-limit temperature referred to above may be pre-registered in the temperature controller 133, or may be pre-registered as one of the image capturing conditions in the controller 28, and transmitted from the controller 28 via the communication unit 136 to the temperature controller 133 before a radiation image is captured.

Figure 6:
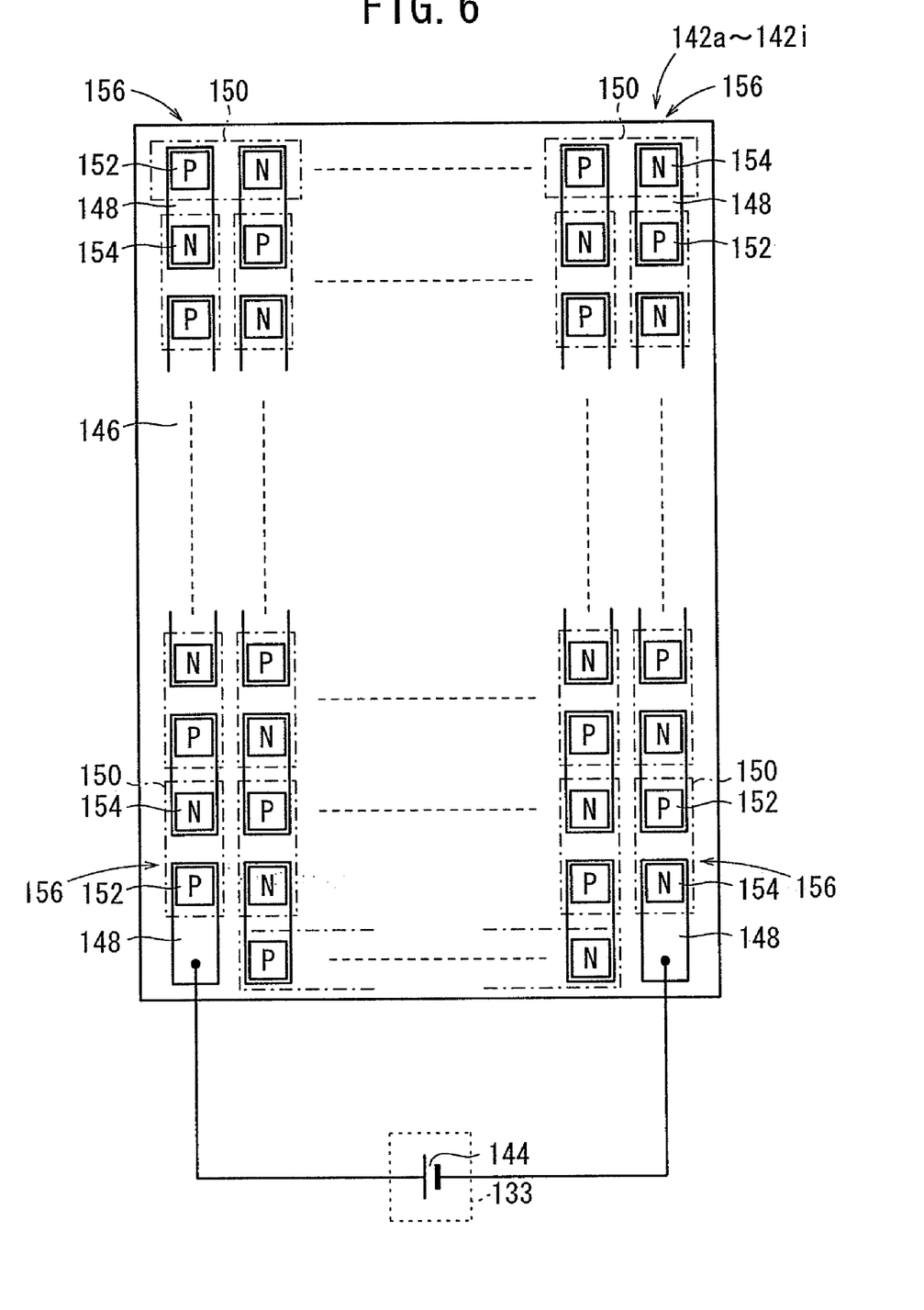
FIG. 6 is a plan view showing the layout of respective Peltier devices disposed in each of the cooling units shown in FIG. 2.

FIG. 6 shows in plan the layout of the Peltier devices 156 disposed in each of the cooling units 142a through 142i. The sensor substrate 38 and the exothermic substrate 158 (see FIGS. 1 through 3, and FIG. 5) have been omitted from illustration. In FIG. 6, the Peltier devices 156 are shown as viewed in a direction from the exothermic substrate 158 toward the sensor substrate 38.

As shown in FIG. 6, in each of the cooling units 142a through 142i, the Peltier devices 156 are arrayed in a matrix on the endothermic substrate 146. When the Peltier devices 156 are supplied with direct current from the DC power supply 144, each of the Peltier devices 156 absorbs heat of the amorphous selenium from the sensor substrate 38, and radiates the heat through the exothermic substrate 158 (see FIG. 5) and out of the cooling panel 130. The temperature controller 133 (see FIG. 1) of the cooling panel energizing unit 132 can selectively supply direct current from the DC power supply 144 to the cooling units 142a through 142i, and thereby radiate heat of the amorphous selenium within given areas of the sensor substrate 38, which face the cooling units 142a through 142i, through the cooling units and out of the cooling panel 130.

The area specifying unit 134 (see FIG. 1) specifies pixels 50 in which radiation image information is to be recorded, based on the image capturing conditions transmitted from the controller 28 via the communication unit 136, and outputs each of the specified pixels 50 as a radiation image information recording area to the timing control circuit 48, the temperature controller 133, the timing control signal detector 270, and the exposure detector 272. Therefore, the controller 28 preferably sends the image capturing conditions to the area specifying unit 134 to cause the area specifying unit 134 to specify recording areas, before the subject 22 is irradiated with radiation X, or more specifically, before the radiation X reaches the irradiated surface of the sensor substrate 38 and stores electric charges in the storage capacitors 53 (see FIG. 3).

Based on the supplied recording areas, the timing control circuit 48 outputs a timing control signal to the gate line driving circuit 44 and to the signal reading circuit 46, in order to read image signals from the specified pixels 50. Also, based on the supplied recording areas, the temperature controller 133 supplies direct current from the DC power supply 144 to the Peltier devices 156 (see FIGS. 5 and 6) of the cooling units 142a through 142i, which face the specified pixels 50.

The timing control signal detector 270 detects the timing control signal output from the timing control circuit 48, and outputs the detected timing control signal to the temperature controller 133 as an image information output detection signal. Specifically, since radiation image information is read from the pixels 50 (see FIG. 3) that form the recording areas, in response to the timing control signal output from the timing control circuit 48 to the gate line driving circuit 44 and the signal reading circuit 46, the timing control signal detector 270 detects reading of radiation image information from the pixels 50, and outputs the detected reading as an image information output detection signal to the temperature controller 133. Since the area specifying unit 134 outputs the recording areas to the timing control signal detector 270, the timing control signal detector 270 is capable of monitoring (detecting) whether or not the timing control circuit 48 has supplied the timing control signal for given pixels 50 only as the recording areas.

Based on the recording areas supplied from the area specifying unit 134, the exposure detector 272 detects the storage of electric charges in the storage capacitors 53, or the generation of electric charges in the photoelectric conversion layer 51 of those pixels 50 which are not specified as recording areas, and outputs the detected storage or generation as an image recording detection signal to the temperature controller 133. Specifically, when electric charges are stored in the storage capacitors 53 or are generated in the photoelectric conversion layer 51 by exposure to radiation X, radiation image information is recorded in the pixels 50. The exposure detector 272 detects the recording of radiation image information in the unspecified pixels 50, i.e., the exposure to radiation X, and outputs the detected recording as the image recording detection signal to the temperature controller 133.

When the temperature controller 133 is supplied with the image recording detection signal and/or with the image information output detection signal, the temperature controller 133 judges that radiation image information is being recorded or the recorded radiation image information is being read. The temperature controller 133 then stops the supply of direct current from the DC power supply 144 to the Peltier devices 156, and deenergizes the fan 140, thereby temporarily halting temperature regulation on the sensor substrate 38.

When supply of the image recording detection signal and/or the image information output detection signal to the temperature controller 133 is stopped, the temperature controller 133 judges that recording or reading of radiation image information has been completed. The temperature controller 133 supplies direct current from the DC power supply 144 to the Peltier devices 156, and energizes the fan 140, thereby resuming temperature regulation on the sensor substrate 38.

The image capturing system 20 is basically constructed as described above. Operations of the image capturing system 20 shall be described below with reference to FIGS. 1 through 6.

Using the console 30, an operator, typically a radiological technician, sets ID information about the subject 22, image capturing conditions, etc. The ID information includes information as to the name, age, sex, etc., of the subject 22, and can be acquired from an ID card possessed by the subject 22. The image capturing conditions include, in addition to information about the region of the subject 22 to be imaged, an image capturing direction, etc., as specified by the doctor in charge of the subject 22, an irradiation dose of the radiation X depending on the region to be imaged, and the upper-limit temperature for the sensor substrate 38, which corresponds to an upper-limit value of the temperature range for amorphous selenium. If the image capturing system 20 is connected to a network, then such items of information can be acquired from a higher-level apparatus through the network. Alternatively, the items of information can be entered from the console 30 by the operator.

After the region to be imaged of the subject 22 has been positioned with respect to the radiation solid-state detecting device 26, the controller 28 controls the radiation generator 24 and the radiation solid-state detecting device 26 according to the set image capturing conditions. Based on the image capturing conditions sent from the controller 28 via the communication unit 136, the area specifying unit 134 of the radiation solid-state detecting device 26 specifies pixels 50 in which to record radiation image information, and outputs each of the specified pixels 50 as a recording area for the radiation image information to the timing control circuit 48, the temperature controller 133, the timing control signal detector 270, and the exposure detector 272.

The temperature sensor 138 detects the temperature of the sensor substrate 38 depending on the temperature of the amorphous selenium at all times, or at certain time intervals, and outputs the detected temperature of the sensor substrate 38 to the temperature controller 133. Based on the input recording areas, the temperature controller 133 selects corresponding ones of the cooling units 142a through 142i, to which direct current from the DC power supply 144 is supplied, and determines whether the temperature of the sensor substrate 38 exceeds a given upper-limit temperature, depending on the upper-limit value of the temperature range for the photoelectric conversion layer 51 (amorphous selenium), each time the temperature controller 133 is supplied with the temperature of the sensor substrate 38 from the temperature sensor 138, which may occur at all times or at certain time intervals.

The radiation generator 24 applies radiation X to the subject 22 according to the image capturing conditions sent from the controller 28. Radiation X, which has passed through the subject 22, is converted into electric signals by the photoelectric conversion layer 51 of the pixels 50 of the specified recording areas in the sensor substrate 38 of the radiation solid-state detecting device 26. The electric signals are stored as electric charges in the storage capacitors 53 (see FIG. 3). The stored electric charges, which represent radiation image information of the subject 22, are read from the storage capacitors 53 according to the timing control signal supplied from the timing control circuit 48 to the gate line driving circuit 44 and to the signal reading circuit 46.

As described above, since the area specifying unit 134 outputs the recording areas to the timing control circuit 48, the timing control circuit 48 outputs the timing control signal based on the recording areas to the gate line driving circuit 44 and to the signal reading circuit 46, in order to read image signals from the pixels 50 of the storage capacitors 53 where electric charges have been stored based on the recording areas.

Specifically, the gate line driving circuit 44 selects one of the gate lines 54 according to the timing control signal from the timing control circuit 48, and supplies a drive signal to bases of the TFTs 52 connected to the selected gate line 54. The multiplexer 60 of the signal reading circuit 46 successively switches between the signal lines 56 connected to the reading ICs 42 and selects one of the signal lines 56 at a time. The electric charge representing the radiation image information that is stored in the storage capacitor 53 of the pixel 50, which corresponds to the selected gate line 54 and the selected signal line 56, is supplied through the resistor 64 to the operational amplifier 66. The operational amplifier 66 integrates the supplied electric charge and supplies it through the multiplexer 60 to the A/D converter 62, which converts the electric charge into a digital image signal. The digital image signal is supplied through the communication unit 136 to the image processor 32. After all of the image signals have been read from the pixels 50 connected to the selected gate line 54, the gate line driving circuit 44 selects the next gate line 54 and supplies a drive signal to the selected gate line 54. The signal reading circuit 46 then successively reads image signals from the TFTs 52 connected to the selected gate line 54 in the same manner as described above. The above operation is repeated in order to read two-dimensional radiation image information stored in the pixels 50, as specified recording areas in the sensor substrate 38, and to supply the read two-dimensional radiation image information to the image processor 32.

The radiation image information supplied to the image processor 32 is processed thereby. The display device 34 displays, for diagnostic purposes, an image based on the processed radiation image information from the image processor 32. The doctor makes a diagnosis based on the image displayed on the display device 34.

The temperature controller 133 (see FIG. 1) sequentially determines whether (the temperature of the sensor substrate 38 depending on) the temperature of the amorphous selenium in the recording areas exceeds (the upper-limit temperature of the sensor substrate 38 depending on the upper-limit value of) the temperature range for amorphous selenium. If the temperature controller 133 judges that the temperature of the sensor substrate 38 exceeds the upper-limit temperature, then the temperature controller 133 selects those from among the cooling units 142a through 142i which face the recording areas, supplies direct current from the DC power supply 144 to the Peltier devices 156 of the selected cooling units 142a through 142i, and energizes the fan 140.

The Peltier devices 156 supplied with direct current exhibit a phenomenon referred to as the Peltier effect, i.e., the junctions between the endothermic electrodes 148 and the P-type semiconductor devices 152 and the N-type semiconductor devices 154 absorb heat of the amorphous selenium from the sensor substrate 38 through the endothermic substrate 146, and the junctions between the P-type semiconductor devices 152 and the N-type semiconductor devices 154 and the exothermic electrodes 150 radiate heat, which has been transferred from the junctions of the endothermic electrodes 148 through the P-type semiconductor devices 152 and the N-type semiconductor devices 154, through the exothermic substrate 158, and out of the cooling panel 130. The fan 140 applies air to the exothermic substrate 158 in order to cool the exothermic substrate 158 and to promote heat radiation therefrom.

If the temperature controller 133 judges that the temperature of the sensor substrate 38 detected by the temperature sensor 138 becomes lower than the upper-limit temperature, then the temperature controller 133 halts the supply of direct current from the DC power supply 144 to the Peltier devices 156 and deenergizes the fan 140.

The area specifying unit 134 also outputs the specified recording areas to the timing control signal detector 270 and to the exposure detector 272. The timing control signal detector 270 monitors (detects) whether the timing control circuit 48 has supplied the timing control signal only for pixels 50 specified as recording areas. If the timing control signal detector 270 detects the output of the timing control signal from the timing control circuit 48, the timing control signal detector 270 outputs the detected output as an image information output detection signal to the temperature controller 133. When the exposure detector 272 detects the storage of electric charges in the storage capacitors 53, or the generation of electric charges in the photoelectric conversion layer 51 of pixels 50 that are not specified as recording areas, based on the recording areas supplied from the area specifying unit 134, the exposure detector 272 outputs the detected storage or generation of electric charges as an image recording detection signal to the temperature controller 133.

When the temperature controller 133 is supplied with the image recording detection signal and/or the image information output detection signal, the temperature controller 133 judges that radiation image information has started to be recorded in the pixels 50 specified as recording areas, or that the recorded radiation image information has started to be read from the pixels 50 specified as recording areas. The temperature controller 133 then halts the supply of direct current from the DC power supply 144 to the Peltier devices 156 and deenergizes the fan 140, thereby halting temperature regulation on the sensor substrate 38.

When supply of the image recording detection signal and/or the image information output detection signal to the temperature controller 133 is halted, the temperature controller 133 judges that recording or reading of the radiation image information has been completed. The temperature controller 133 supplies direct current from the DC power supply 144 to the Peltier devices 156 and energizes the fan 140, thereby resuming the temperature regulation that is performed on the sensor substrate 38.

In the image capturing system 20 according to the present embodiment, the radiation solid-state detecting device 26 includes the sensor substrate 38, the temperature regulation control unit 135 for performing a temperature regulation control operation to adjust the sensor substrate 38 to a predetermined temperature, and the timing control signal detector 270 for detecting the reading (output) of the radiation image information from the sensor substrate 38, and outputting the detected reading as an image information output detection signal to the temperature regulation control unit 135. When the temperature regulation control unit 135 is supplied with the image information output detection signal, the temperature regulation control unit 135 halts the temperature regulation control operation performed on the sensor substrate 38.

Therefore, when radiation image information is read (output), the temperature regulation control unit 135 temporarily halts the temperature regulation control operation from being performed on the sensor substrate, based on the image information output detection signal. As a result, noise caused by the temperature regulation control operation is prevented from being added to the radiation image (radiation image information), and hence, the produced radiation image is high in quality.

The exposure detector 272 detects recording of radiation image information in the sensor substrate 38, i.e., the application of radiation X to the sensor substrate 38, and outputs the detected recording as an image recording detection signal to the temperature controller 133. Based on the supplied image recording detection signal and/or the image information output detection signal, the temperature controller 133 temporarily halts the temperature regulation from being performed on the sensor substrate 38. The temperature regulation control unit 135 thus stops the temperature regulation control operation on the sensor substrate 38 not only when radiation image information is read (output), but also during recording of the radiation image information. Consequently, noise caused by the temperature regulation control operation is reliably prevented from being added to the radiation image information, and hence the produced radiation image is high in quality.

The temperature regulation control unit 135 comprises the cooling panel 130, which is disposed on the rear surface of the sensor substrate 38 for cooling the sensor substrate 38, and the cooling panel energizing unit 132 for energizing the cooling panel 130. Therefore, the temperature regulation control unit 135 can reliably cool the sensor substrate 38.

The cooling panel 130 comprises the cooling units 142a through 142i, which are placed on the rear surface of the sensor substrate 38. The temperature controller 133 of the cooling panel energizing unit 132 (the temperature regulation control unit 135) energizes those among the cooling units 142a through 142i which face toward the specified recording areas. Since the temperature controller 133 selectively energizes the cooling units 142a through 142i based on the specified recording areas, the specified recording areas are reliably cooled, whereas other areas of the sensor substrate 38 are prevented from being cooled. As a result, the sensor substrate 38 is effectively cooled without wasteful energy consumption.

The cooling panel energizing unit 132 comprises the temperature controller 133, the temperature sensor 138, and the fan 140. The temperature sensor 138 detects the temperature of the sensor substrate 38 depending on the temperature of the amorphous selenium within the specified recording areas. The temperature controller 133 determines whether the detected temperature exceeds the upper-limit temperature for the sensor substrate 38, depending on the upper-limit value of the temperature range for amorphous selenium. If the temperature controller 133 judges that the detected temperature exceeds the upper-limit temperature, then the temperature controller 133 energizes the cooling panel 130 and the fan 140, so that (the temperature of the amorphous selenium indicated by) the temperature of the sensor substrate 38 will drop to (the upper-limit value of the temperature range indicated by) the upper-limit temperature. The fan 140 applies air to the cooling panel 130 for promoting the transfer of heat radiation from the sensor substrate 38 to the cooling panel 130, and out of the cooling panel 130. Therefore, the cooling panel 130 and the sensor substrate 38 are cooled efficiently.

Each of the cooling areas 142a through 142i comprises Peltier devices 156 arrayed in a matrix on the endothermic substrate 146 and held closely against the rear surface of the sensor substrate 38. The temperature controller 133 cools specified recording areas by supplying direct current from the DC power supply 144 to the Peltier devices 156. Heat within the sensor substrate 38 is thus reliably radiated out of the cooling panel 130 based on the Peltier effect exhibited by the Peltier devices 156.

Before radiation image information is recorded in the sensor substrate 38, the area specifying unit 134 specifies certain pixels 50 in the sensor substrate 38 as pixels 50, which are to be used for recording radiation image information, based on image capturing conditions from the controller 28, and outputs the specified pixels 50 as recording areas to the timing control circuit 48, the temperature controller 133, the timing control signal detector 270, and the exposure detector 272.

Based on the recording areas, the timing control circuit 48 outputs a timing control signal to the gate line driving circuit 44 and to the signal reading circuit 46, for thereby reliably reading image signals from the pixels 50 where radiation image information has been recorded. Based on the recording areas, the temperature controller 133 supplies direct current from the DC power supply 144 to the Peltier devices 156 of those from among the cooling units 142a through 142i that correspond to the recording areas. Based on the recording areas, the timing control signal detector 270 efficiently detects the output of the timing control signal. Based on the recording areas, the exposure detector 272 reliably and efficiently detects the storage of electric charges in the storage capacitors 53, or detects the generation of electric charges (the application of radiation X) in the photoelectric conversion layer 51 of pixels 50 that have not been specified as recording areas.

In the present embodiment, instead of the above structure, the temperature regulation control unit 135 may relax the temperature regulation control operation on the sensor substrate 38 based on the image recording detection signal and/or the image information output detection signal. The temperature regulation control operation may be relaxed by reducing the rotation number of the fan 140 of the temperature regulation control unit 135 to half, preferably to ⅓, of the rotation number in the normal operation. The temperature regulation control operation may also be relaxed by reducing the amount of the direct current supplied to the Peltier devices 156 to half, preferably to ⅓, of the amount of the direct current supplied thereto in the normal operation. By controlling the rotation number of the fan 140 and/or the amount of current supplied to the Peltier devices 156, the same advantages as the aforementioned embodiment can be achieved.

Alternatively, when the temperature regulation control is operated by using both the fan 140 and the Peltier devices 156, the temperature regulation control unit 135 may relax the temperature regulation control operation on the sensor substrate 38 based on the image recording detection signal and/or the image information output detection signal by stopping either the operation of the fan 140 or the operation of the Peltier devices 156.

In the above description, the cooling panel 130 is disposed on the rear surface of the sensor substrate 38. However, the cooling panel 130 may also be disposed on the irradiated surface of the sensor substrate 38. Even if the cooling panel 130 is disposed on the irradiated surface of the sensor substrate 38, since the cooling panel 130 is disposed on the surface of the sensor substrate 38, the cooling panel 130 offers the same advantages of the present invention as described above.

If the cooling panel 130 is disposed on the irradiated surface of the sensor substrate 38, then the cooling panel 130 must be made permeable to the radiation X. Since the endothermic electrodes 148, the P-type semiconductor devices 152, the N-type semiconductor devices 154, and the exothermic electrodes 150 of each of the cooling units 142a through 142i contain metals, a portion of the radiation X applied to the sensor substrate 38 may possibly be absorbed by such metals. To avoid this drawback, the layout pattern of the Peltier devices 156 within the cooling units 142a through 142i may be pre-registered, so that when radiation image information is input thereto, any reduction in quality of the radiation image information may be compensated for by means of an image processing process, based on the registered layout pattern. In this manner, the radiation image information is prevented from being adversely affected by undue absorption of radiation X by the metals.

Figure 7:
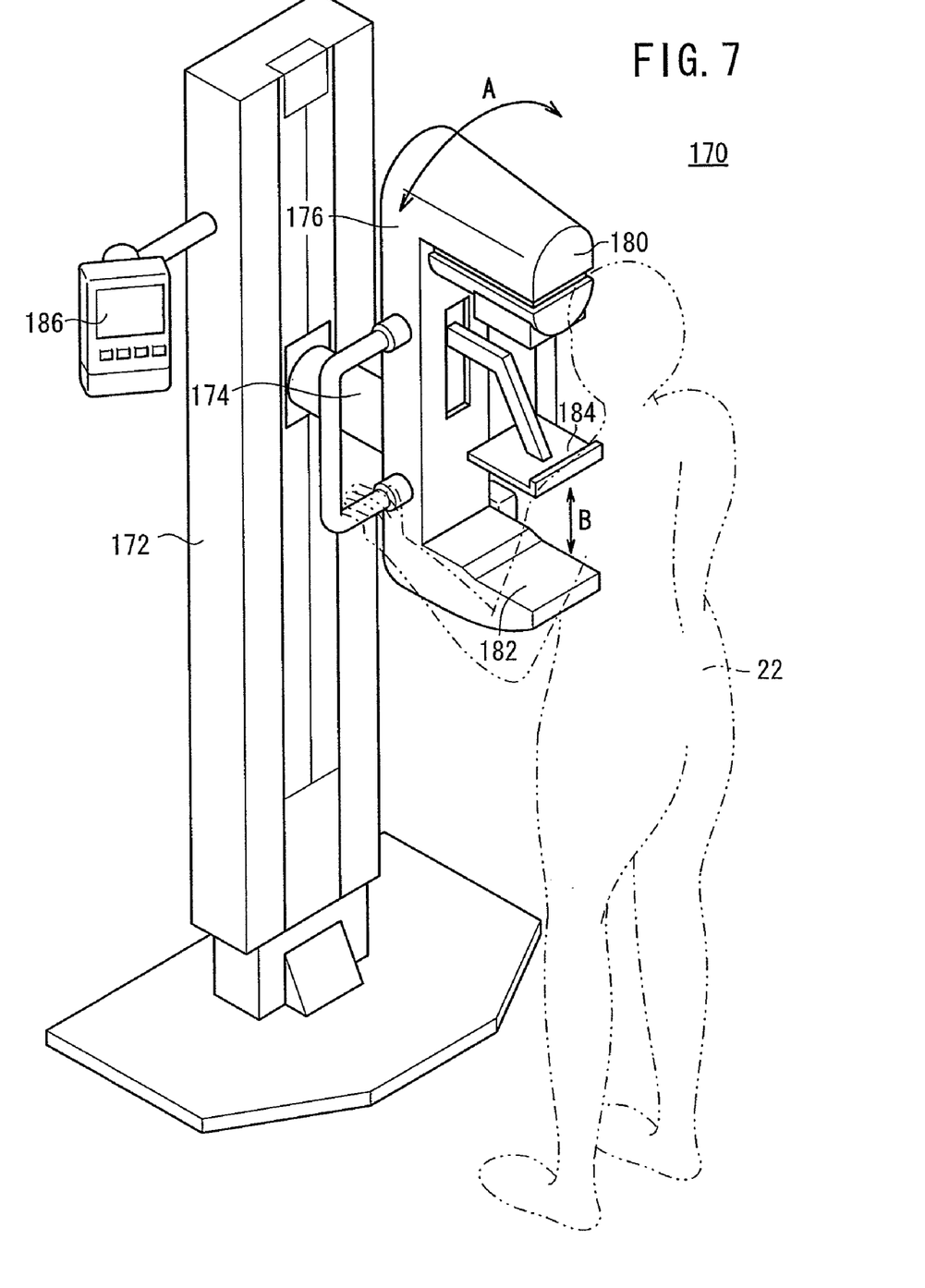
FIG. 7 is a perspective view of a mammographic apparatus, which incorporates the image capturing system shown in FIG. 1.

FIG. 7 shows in perspective a mammographic apparatus 170 utilized for breast cancer screening, which incorporates the image capturing system 20 according to the present embodiment.

As shown in FIG. 7, the mammographic apparatus 170 includes an upstanding base 172, a vertical arm 176 fixed to a horizontal swing shaft 174 disposed substantially centrally on the base 172, a radiation source housing unit 180 housing therein a radiation source (not shown) for applying radiation X to a breast 179 (see FIG. 8) of a subject 22 to be imaged, and which is fixed to an upper end of the arm 176, an image capturing base 182 mounted on a lower end of the arm 176 in confronting relation to the radiation source housing unit 180, and a compression plate 184 for compressing and holding the subject's breast 179 against the image capturing base 182.

When the arm 176, to which the radiation source housing unit 180 and the image capturing base 182 are secured, is moved angularly about the swing shaft 174 in the directions indicated by the arrow A, an image capturing direction with respect to the breast 179 of the subject 22 may be adjusted. The compression plate 184, which is coupled to the arm 176, is disposed between the radiation source housing unit 180 and the image capturing base 182. The compression plate 184 is vertically displaceable along the arm 176 in the directions indicated by the arrow B.

A display control panel 186 is connected to the base 172 for displaying image capturing information, including an image capturing region, an image capturing direction, etc., of the subject 22, which have been detected by the mammographic apparatus 170, along with ID information of the subject 22, etc., and further enabling setting of these items of information if necessary. The display control panel 186 incorporates functions therein that are part of the functions of the console 30 and the display device 34 (see FIG. 1).

Figure 8:
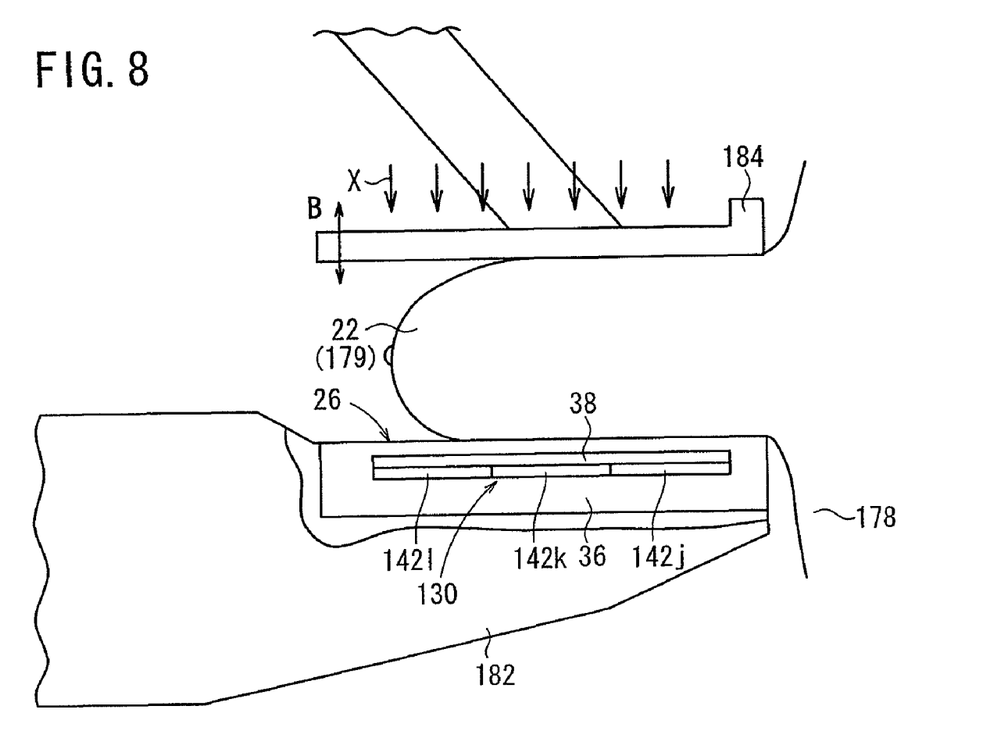
FIG. 8 is a fragmentary vertical elevational view, partly in cross section, showing internal structural details of an image capturing base of the mammographic apparatus shown in FIG. 7.

FIG. 8 shows internal structural details of the image capturing base 182 of the mammographic apparatus 170. In FIG. 8, the breast 179 of the subject 22 to be imaged is shown as being placed between the image capturing base 182 and the compression plate 184.

The image capturing base 182 houses therein the radiation solid-state detecting device 26, for storing radiation image information captured based on radiation X output supplied from the radiation source in the radiation source housing unit 180, and outputting an electric signal representative of the stored radiation image information. In FIG. 8, the cooling panel 130, which is made up of cooling units 142j through 142l, is disposed on a rear surface of the sensor substrate 38.

In the mammographic apparatus 170 shown in FIGS. 7 and 8, the cooling panel 130 is disposed on a rear surface of the sensor substrate 38. However, the cooling panel 130 may also be disposed on the irradiated surface of the sensor substrate 38.

The radiation solid-state detecting device 26, including the cooling panel 130 disposed on the surface of the sensor substrate 38, is housed inside of the image capturing base 182. The mammographic apparatus 170 offers the same advantages according to the present invention as described above. That is, when the breast 179 touches the radiation solid-state detecting device 26, the body temperature of the subject 22 is transmitted to the sensor substrate 38 through the breast 179 so that the temperature of the sensor substrate 38 rises. Therefore, the region of the sensor substrate 38 corresponding to the region where the breast 179 touches is cooled.

Figure 9:
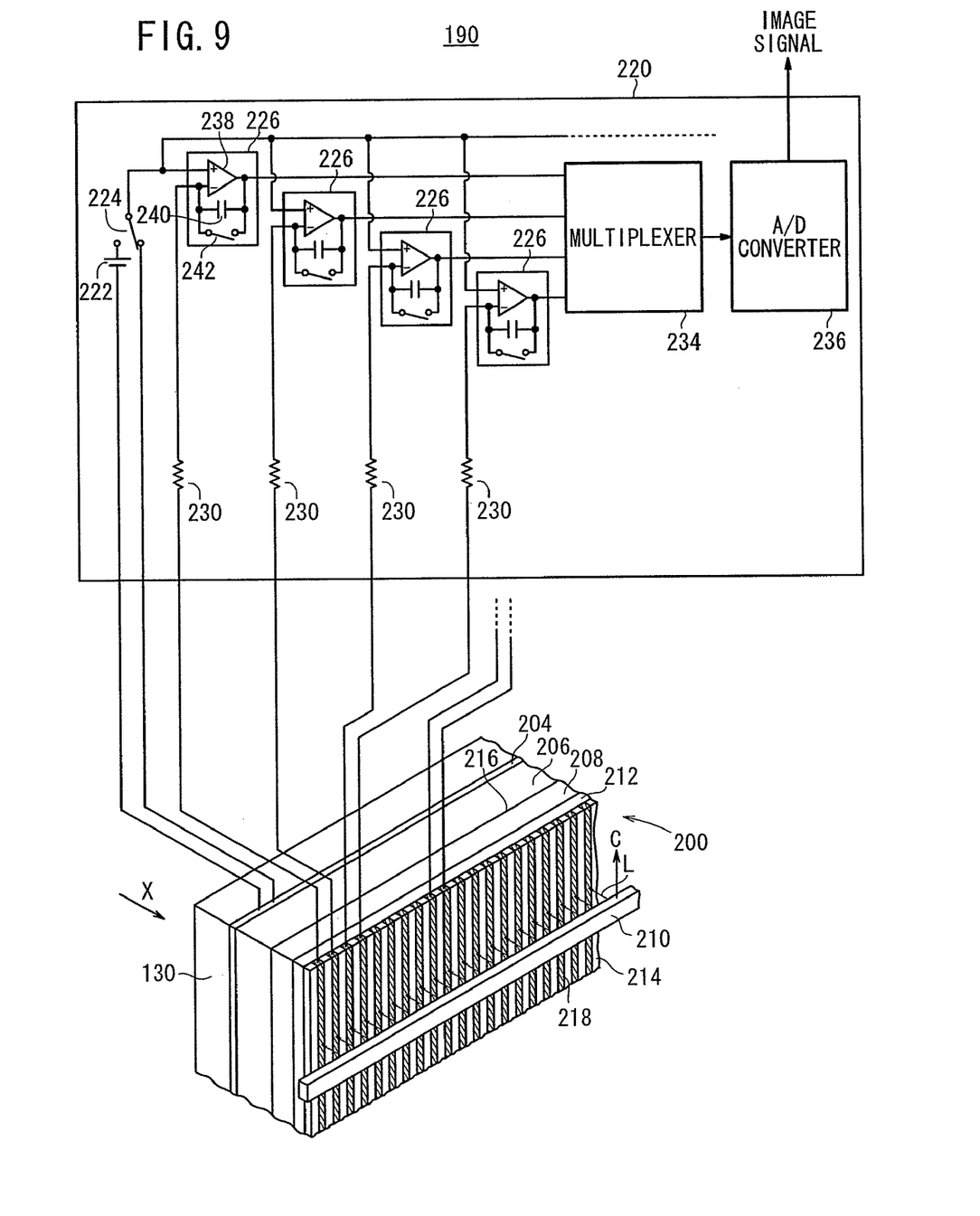
FIG. 9 is a view showing a radiation solid-state detecting device according to another embodiment of the present invention.

FIG. 9 shows a radiation solid-state detecting device 190 of light readout type according to another embodiment of the present invention. Unlike the radiation solid-state detecting device 26 of direct conversion type employing TFTs 52 as shown in FIG. 3, the radiation solid-state detecting device 190 has a sensor substrate 200 for storing radiation image information as an electrostatic latent image, and for reading the electrostatic latent image as electric charge information when the detecting device 190 is irradiated with reading light L from a reading light source 210.

The sensor substrate 200 comprises a first electrode layer 204 permeable to radiation X, a recording photoconductive layer 206 that becomes electrically conductive when irradiated with the radiation X, a charge transport layer 208, which acts substantially as an electric insulator with respect to latent image electric charges and as an electric conductor with respect to transport electric charges of a polarity opposite to the latent image electric charges, a reading photoconductive layer 212 that becomes electrically conductive when irradiated with reading light L from the reading light source 210, and a second electrode layer 214 permeable to the reading light L. These layers being successively arranged in this order, from the surface of the sensor substrate 200 that is irradiated with the radiation X.

A charge storage region 216 for storing electric charges generated by the recording photoconductive layer 206 is disposed between the recording photoconductive layer 206 and the charge transport layer 208. The second electrode layer 214 comprises a number of linear electrodes 218 extending in the direction indicated by the arrow C, which is perpendicular to the direction in which the reading light source 210 extends. The first electrode layer 204 and the linear electrodes 218 of the second electrode layer 214 are connected to a signal reading circuit 220, for thereby reading electric charge information of the latent image electric charges stored in the charge storage region 216.

The signal reading circuit 220 comprises a power supply 222 and a switch 224 for applying a given voltage between the first electrode layer 204 and the second electrode layer 214 of the sensor substrate 200, a plurality of current detecting amplifiers 226 connected to the linear electrodes 218 of the second electrode layer 214 for detecting currents, which represent the radiation image information as latent image electric charges, a plurality of resistors 230 connected to the current detecting amplifiers 226, a multiplexer 234 for successively switching between output signals from the current detecting amplifiers 226, and an A/D converter 236 for converting analog image signals from the multiplexer 234 into digital image signals. Each of the current detecting amplifiers 226 comprises an operational amplifier 238, an integrating capacitor 240, and a switch 242.

In FIG. 9, the cooling panel 130 is disposed on the irradiated surface of the sensor substrate 200. However, the cooling panel 130 may also be disposed on the rear surface of the sensor substrate 200.

The radiation solid-state detecting device 190 shown in FIG. 9 operates as follows. The switch 224 is operated to connect the movable contact thereof to the power supply 222 and to apply a voltage between the first electrode layer 204 and the second electrode layer 214, whereupon radiation X is applied to the subject 22 (see FIG. 1). Radiation X that has passed through the subject 22 is applied through the first electrode layer 204 to the recording photoconductive layer 206. The recording photoconductive layer 206 becomes electrically conductive and generates electric charge pairs. Among the generated electric charge pairs, positive electric charges are combined with negative electric charges supplied from the power supply 222 to the first electrode layer 204, and the positive charges disappear. The negative electric charges generated by the recording photoconductive layer 206 move toward the charge transport layer 208. Since the charge transport layer 208 acts substantially as an electric insulator with respect to the negative electric charges, the negative electric charges are stored as an electrostatic latent image in the charge storage region 216, which exists as an interface between the recording photoconductive layer 206 and the charge transport layer 208.

After the electrostatic latent image has been stored in the sensor substrate 200, the signal reading circuit 220 reads the radiation image information. The switch 224 is operated to connect the movable contact thereof between the non-inverting input terminals of the operational amplifiers 238 of the current detecting amplifiers 226 and the first electrode layer 204 of the sensor substrate 200.

While the reading light source 210 moves in the auxiliary scanning direction indicated by the arrow C, the reading light source 210 applies reading light L to the reading photoconductive layer 212. The switches 242 of the current detecting amplifiers 226 are turned on and off at intervals corresponding to the pixel pitch in the auxiliary scanning direction, for thereby reading radiation image information as the electric charge information representing the electrostatic latent image.

When reading light L is applied through the second electrode layer 214 to the reading photoconductive layer 212, the reading photoconductive layer 212 becomes electrically conductive and generates electric charge pairs. Among the generated electric charge pairs, positive electric charges therefrom reach the charge storage region 216 through the charge transport layer 208, which acts substantially as an electric insulator with respect to the positive electric charges. In the charge storage region 216, the positive electric charges are combined with negative electric charges, which represent the electrostatic latent image stored in the charge storage region 216, and the positive charges disappear. The negative electric charges generated by the reading photoconductive layer 212 are recombined with the positive electric charges of the linear electrodes 218 of the second electrode layer 214, and also disappear. When the electric charges disappear, currents are generated by the linear electrodes 218, which are read by the signal reading circuit 220 as electric charge information representing the radiation image information.

Currents generated by the linear electrodes 218 are integrated by the current detecting amplifiers 226 and supplied as voltage signals to the multiplexer 234. The multiplexer 234 successively switches between the current detecting amplifiers 226 in the main scanning direction along which the linear electrodes 218 are arrayed, and supplies voltage signals to the A/D converter 236. The A/D converter 236 converts the supplied voltage signals as an analog image signal into a digital image signal, and supplies the digital image signal representing the radiation image information to the image processor 32. Each time that radiation image information is read from an array of pixels across the auxiliary scanning direction, the switches 242 of the current detecting amplifiers 226 are turned on to discharge the electric charges stored in the integrating capacitors 240. While the reading light source 210 is moved in the auxiliary scanning direction, as indicated by the arrow C, the above operations are repeated to read two-dimensional radiation image information stored in the sensor substrate 200.

In the image capturing system 20, which incorporates the radiation solid-state detecting device 190 therein, the cooling panel 130 is disposed on the surface of the sensor substrate 38. Therefore, the image capturing system 20 incorporating the radiation solid-state detecting device 190 offers the advantages of the present invention described above.

Rather than the radiation solid-state detecting devices 26 of the direct conversion type or the radiation solid-state detecting device 190 of the light readout type for converting applied radiation X directly into electric charge information, a radiation detector of indirect conversion type including a scintillator may be employed for converting applied radiation X into visible light, together with a detecting device for converting the visible light into electric charge information.

Instead of the TFTs 52, such a device as a CCD (Charge Coupled Device), a CMOS (Complementary Metal Oxide Semiconductor) device or the like may be used for a radiation detecting device of the direct or indirect conversion type.

Although certain preferred embodiments of the present invention have been shown and described in detail, it should be understood that various changes and modifications may be made to the embodiments without departing from the scope of the invention as set forth in the appended claims.

What is claimed is:

1. An image detecting device comprising:
   an image detector for recording an image and outputting the recorded image as image information;
   a temperature regulation control unit for performing a temperature regulation control operation to adjust the image detector to a predetermined temperature; and
   an image information output detecting unit for detecting the output of the image information from the image detector, and outputting the detected output as an image information output detection signal to the temperature regulation control unit,
   wherein the temperature regulation control unit halts a temperature regulation control operation on the image detector based on the image information output detection signal that is input thereto.

2. An image detecting device according to claim 1, further comprising:
   an image recording detecting unit for detecting the recording of the image in the image detector, and outputting the detected recording as an image recording detection signal to the temperature regulation control unit,
   wherein the temperature regulation control unit halts the temperature regulation control operation on the image detector based on the image recording detection signal or the image information output detection signal that is input thereto.

3. An image detecting device according to claim 1, wherein the temperature regulation control unit comprises:
   a cooling panel disposed on a surface of the image detector for cooling the image detector; and
   a cooling panel energizing unit for energizing the cooling panel.

4. An image detecting device according to claim 3, wherein the cooling panel comprises
   a plurality of cooling units disposed on the surface of the image detector,
   wherein the cooling panel energizing unit energizes those of the cooling units which correspond to recording areas of the image detector which record the image therein.

5. An image detecting device according to claim 3, wherein the cooling panel energizing unit comprises:
   a temperature sensor for detecting a temperature of the image detector;
   a temperature controller for energizing the cooling panel to cool the image detector to lower the temperature thereof to a predetermined temperature; and
   a cooling fan for applying air to the cooling panel to cool the cooling panel.

6. An image detecting device according to claim 3, wherein the cooling panel comprises
   a matrix of Peltier devices disposed on the surface of the image detector,
   wherein the cooling panel energizing unit supplies current to the Peltier devices to cool the image detector.

7. An image detecting device according to claim 6, wherein the cooling panel comprises
   a plurality of cooling units disposed on the surface of the image detector,
   wherein each of the cooling units comprises:
   an endothermic substrate mounted on the surface of the image detector;
   a plurality of endothermic electrodes disposed at spaced intervals on the endothermic substrate;
   P-type semiconductor devices and N-type semiconductor devices, which are disposed on respective opposite ends of the endothermic electrodes;
   a plurality of exothermic electrodes each interconnecting a P-type semiconductor device connected to one of the endothermic electrodes and an N-type semiconductor device connected to an adjacent one of the endothermic electrodes; and
   an exothermic substrate disposed on the exothermic electrodes.

8. An image detecting device according to claim 7, wherein each of the Peltier devices comprises:
   two adjacent endothermic electrodes;
   one of the exothermic electrodes extending between the two adjacent endothermic electrodes; and
   one of the P-type semiconductor devices and one of the N-type semiconductor devices, which are interconnected by the one of the exothermic electrodes.

9. An image detecting device according to claim 7, wherein the endothermic substrate and the exothermic substrate are arranged to have a thermal conductivity thereof oriented from the image detector toward the cooling units.

10. An image detecting device according to claim 3, wherein the temperature regulation control unit controls the cooling panel energizing unit for energizing the cooling panel to cool the image detector to lower the temperature thereof below a predetermined upper-limit temperature when the temperature of a photoelectric conversion layer of the image detector exceeds the predetermined upper-limit temperature.

11. An image detecting device according to claim 1, wherein the image detecting device comprises a radiation image information detecting device, wherein the image detector records radiation having passed through a subject and applied to a surface of the image detector as a radiation image, and outputs the recorded radiation image as radiation image information;
    the cooling panel is disposed on either the surface of the image detector that is irradiated with the radiation, or an opposite rear surface of the image detector; and
    the cooling panel is permeable to the radiation if the cooling panel is disposed on the surface of the image detector that is irradiated with the radiation.

12. An image detecting device according to claim 11, wherein the image detecting device comprises a radiation solid-state detecting device for storing the radiation having passed through the subject as electric charge information, and reading the stored electric charge information as the radiation image information.

13. An image detecting device according to claim 12, wherein the radiation solid-state detecting device comprises a light reading detector for reading the stored electric charge information as the radiation image information in response to reading light applied thereto.

14. An image detecting device according to claim 1, further comprising:
    an area specifying unit for specifying a recording area for the image in the image detector based on predetermined image capturing conditions, and outputting the specified recording area to the temperature regulation control unit and to the image information output detecting unit.

15. An image capturing system comprising:
    an image detecting device according to claim 1; and
    a controller for controlling the image detecting device.

16. An image capturing system according to claim 15, further comprising:
    a radiation generator for generating radiation and applying the radiation to a subject;

wherein the image detecting device records the radiation having passed through the subject as a radiation image, and outputs the recorded radiation image as radiation image information; and the controller controls the radiation generator and the image detecting device.

17. An image capturing system according to claim 16, further comprising:

an image processor for processing the radiation image information output from the image detecting device;

wherein the temperature regulation control unit comprises a cooling panel disposed on a surface of the image detector;

the cooling panel comprises a matrix of Peltier devices disposed on the surface of the image detector; and the image processor corrects the radiation image information based on a layout pattern of the Peltier devices of the cooling panel.

18. An image detecting device comprising:

an image detector for recording an image and outputting the recorded image as image information;

a temperature regulation control unit for performing a temperature regulation control operation to adjust the image detector to a predetermined temperature; and an image information output detecting unit for detecting the output of the image information from the image detector, and outputting the detected output as an image information output detection signal to the temperature regulation control unit, wherein the temperature regulation control unit relaxes a temperature regulation control operation on the image detector based on the image information output detection signal that is input thereto.

19. An image detecting device according to claim 18, further comprising:

an image recording detecting unit for detecting the recording of the image in the image detector, and outputting the detected recording as an image recording detection signal to the temperature regulation control unit, wherein the temperature regulation control unit relaxes the temperature regulation control operation on the image detector based on the image recording detection signal or the image information output detection signal that is input thereto.

* * * * *